United States Patent [19]

Reeners et al.

[11] Patent Number: 4,752,081
[45] Date of Patent: Jun. 21, 1988

[54] FIFTH WHEEL BEARING PLATE COVER WITH INBOARD PROTECTIVE SKIP PLATES

[76] Inventors: Donald G. Reeners, 2415 Wilcox Rd., Macedon, N.Y. 14502; John B. Colwell, Route 5, Lucknow, Ontario, Canada, N0G2H0; Orion G. Patton, 1712 Arabian Way, Falston, Md. 21047

[21] Appl. No.: 90,846

[22] Filed: Aug. 31, 1987

[51] Int. Cl.⁴ .................. B62D 53/08; F16C 17/04
[52] U.S. Cl. ................................. 280/433; 384/421
[58] Field of Search ..................... 280/433; 384/421

[56] References Cited

U.S. PATENT DOCUMENTS

| | | | |
|---|---|---|---|
| 3,704,924 | 12/1972 | Lowry | 280/433 X |
| 3,924,909 | 12/1975 | Kent et al. | 280/433 X |
| 4,169,635 | 10/1979 | Szalay et al. | 280/433 X |
| 4,542,912 | 9/1985 | St. Louis | 280/433 |

Primary Examiner—John A. Pekar
Attorney, Agent, or Firm—Warren W. Kurz

[57] ABSTRACT

A low-friction plastic covering on the fifth wheel bearing plate of a tractor is protected from damage during tractor/trailer coupling by a pair of elongated metal "skip" plates. Such plates are preferably rectangular in shape and are positioned in the interior region of the plastic covering, one on each side of a tapered slot adapted to receive the kingpin of a trailer's fifth wheel tongue attachment. The size, shape and position of such skip plates minimize wear on the trailer's bolster plate, and minimize any tendency for tearing of the plastic covering during tractor/trailer coupling and normal use of the tractor-trailer. Preferably, the skip plates are welded to the tractor's fifth wheel bearing plate through counterbored slots in the plastic covering, whereby the skip plates additionally function as retainers for attaching the plastic covering to the underlying bearing plate.

8 Claims, 1 Drawing Sheet

FIFTH WHEEL BEARING PLATE COVER WITH INBOARD PROTECTIVE SKIP PLATES

BACKGROUND OF THE INVENTION

This invention relates to improvements in tractor-trailer fifth wheel couplings and, more particularly, to apparatus for protecting a low-friction, plastic bearing plate cover from damage during coupling between a tractor and trailer.

To obviate the need for repeatedly lubricating a fifth wheel tractor-trailer coupling, it is known to provide the tractor's fifth wheel bearing plate with a low friction plastic covering, e.g. coverings of certain ultra high molecular weight polyetheylenes and polypropylenes. See, for example, the disclosures of U.S. Pat. Nos. 4,169,635 and 3,704,924. Such coverings are particularly preferred due to their exceptionally low coefficient of friction and durability. These plastic coverings are commonly held in place on the fifth wheel bearing surface by screws, rivets and/or adhesives.

During the coupling between tractor and trailer, the mating bearing surfaces often impact each other suddenly and with tremendous force. Such impact can cause tearing or shearing of a plastic covering on one or the other of such mating surfaces. To protect these plastic coverings, it has been proposed to provide two protective "riser bars" on the outside peripheral edges of the tractor's fifth wheel bearing plate and its associated sloped flanges. See, for example, the disclosure of U.S. Pat. No. 4,542,912. Such riser bars are substantially flush with the surface of the plastic covering and extend from the forward edge of the sloped flanges backwards along the circular portion of the bearing plate to a point at which the bearing plate is pivotally mounted to the tractor body. The riser bars are positioned in cutout portions of the plastic covering to allow replacement of the covering without disturbing the riser bars. According to the author, such peripherally located riser bars are intended to both guide and pivot the fifth wheel attachment of the tractor so that it is at the correct alignment and location with respect to the trailer during coupling.

In utilizing fifth wheel assemblies having protective riser bars of the type described above, it has been observed that the riser bars, owing to their location, thickness and shape, eventually wear arcuate grooves in the trailer's mating bearing surface (commonly known as the "bolster" plate). Moreover, it has been observed that, perhaps as a result of the bolster plate wearing unevenly and the fact that the riser bars do not extend rearwards beyond the bearing plate pivot axis, there is a tendency for the bolster plate to gouge and tear the protective plastic covering on the tractor's fifth wheel bearing plate. Being located along the outer edge of the substantially circular portion of the tractor's bearing plate, and being flush with the upper surface of the bearing plate's plastic covering, the riser bars frequently contact the trailer's bolster plate at times other then tractor/trailer coupling. For example, normal rocking of the trailer about a horizontal axis extending parallel to the trailer length causes the riser bars to repeatedly impact against the bolster plate. Also, as the tractor turns relative to the trailer to follow curves in the road, the risers bars rub against, and thereby scrape, the trailer's bolster plate. This action is believed to give rise to the observed arcuate grooves in the bolster plate. Further, since the riser bars do not extend beyond the aforementioned pivot axis, they afford no protection from the trailer's bolster plate after the tractor's bearing plate tips (pivotal) to a horizontal seating position during tractor/trailer coupling.

SUMMARY OF THE INVENTION

In view of the foregoing, it is an object of this invention to minimize the above-noted wear on a trailer's fifth wheel bearing surface and the attendant deterioration of the plastic covering on a tractor's fifth wheel bearing surface.

This and other objects of the invention are attained by the provision of a tractor fifth wheel assembly which features a pair of generally rectangular, metal "skip" plates, each being positioned within a similarly shaped slot located in the interior region of a plastic covering which protects a tractor's fifth wheel bearing plate. Preferably, the thickness of the skip plates is slightly less then the thickness of the plastic bearing plate covering, whereby the skip plates are recessed slightly below the upper surface of the covering. Owing to their size, shape and location, the skip bars interact with the trailer bolster plate only during hook-up between tractor and trailer. Hence, the above-noted wear and tear problem are avoided.

The invention will be better understood from the ensuing detailed description of preferred embodiments, reference being made to the accompanying drawings.

DETATILED DESCRIPTION OF PREFERRED EMBODIMENTS

Figure 1:
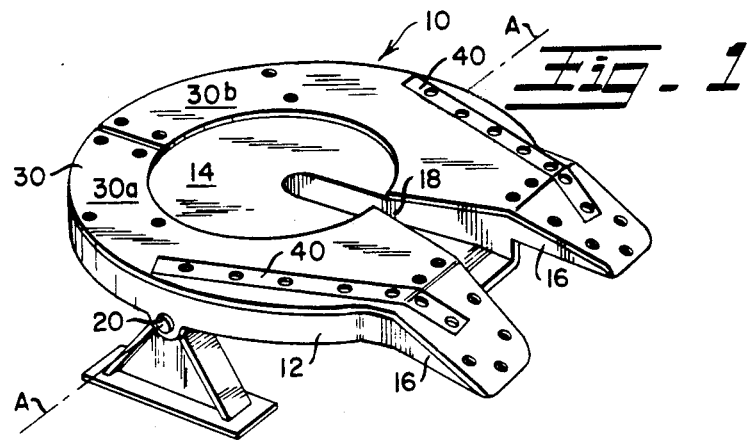
FIG. 1 is a perspective view of a tractor fifth wheel assembly embodying the present invention.
Figure 2:
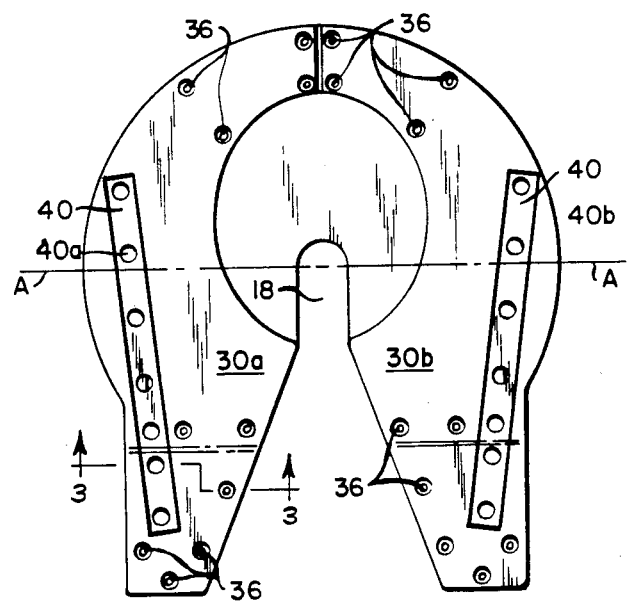
FIG. 2 is a top plan view of the FIG. 1 apparatus.

Referring now to the drawings, FIGS. 1 and 2 illustrate a tractor fifth wheel assembly 10 embodying the present invention. As shown, assembly 10 comprises a bearing plate 12 having a generally circular portion 14 and a pair of diverging flanges 16. The latter slope downwardly from portion 14 and define therebetween a tapered, V-shaped slot 18 which serves, during coupling between tractor and trailer, to guide a trailer's kingpin to a draft connection (not shown) located at the slot apex. Bearing plate 12 is pivotally mounted on the tractor body by a pair of journal pins 20 so that, prior to tractor/trailer coupling, circular portion 14 may be inclined toward the trailer to facilitate coupling and, during and after coupling, may tip towards and assume a horizontal position in which it is substantially flush with the trailer's horizontally disposed bolster plate (not shown).

To reduce wear on the mating bearing surfaces of the tractor/trailer fifth wheel assemble, the tractor's bearing plate is provided with a relatively thick (e.g., 0.25–0.50 inch) covering 30 of a low-friction plastic material (e.g. an ultra high molecular weight polyester). This plastic covering may overlie the entire bearing plate 12 or, as shown, overlie only the raised outer bearing surface of the circular bearing plate portion 14, as well as the flanges 16. While covering 30 may have a one-piece construction, it is preferred that it comprises two separate sections 30a, 30b so that, if necessary, one section may be replaced without disturbing the other.

Covering 30 is rigidly coupled to the underlying metal bearing surface by a plurality of metal fasteners 36. Preferably, each fastener is of the type disclosed in the commonly assigned U.S. patent application Ser. No. 742,767, filed on June 10, 1985, in the names of D. R. Reeners et al., the details of such application being incorporated herein by reference. Briefly, such fasteners are made of metal and have a T-shaped cross section with a centrol bore hole 36a through which they are welded to the underlying substrate. Each fastener is disposed in a similarly shaped, but slightly larger, counterbored aperture in the plastic covering. The fasteners may be attached to the bearing plate by a MIG-welding technique, such as disclosed in the aforementioned application.

To prevent the relatively delicate plastic covering 30 from being gouged and torn during the tractor/trailer coupling (and uncoupling) procedure, a pair of "inboard" skip plates 40 are provided. Unlike the "riser bars" of the aforementioned prior art, each skip plate comprises an elongated rectangular metal (e.g. steel) bar which is rigidly connected, e.g. by a weldament, to bearing plate 12 in a position overlying the interior region of the bearing plate, as opposed to a position following its periphery. As better shown in FIG. 2, each skip plate extends from a forward position overlying a flange 16 to a position rearwards of axis A. Preferred approximate dimensions for each skip plate are 20×2 inches. Skip plates 40 are preferably angularly disposed with respect to each other, as shown. The skip plates extend upwardly from the bearing plate 12 through rectangular slots 30c formed in the plastic bearing plate covering 30. Preferably, skip plates 40 have a thickness slightly less than the thickness of covering 30 so that the top surface of the skip plates is slightly recessed below the upper surface of the plastic covering. A preferred recess is between about 0.010 and 0.030 inch. By slightly recessing the skip plates below the plastic covering the skip plates do not contact the trailer's bolster plate during normal operation of the tractor-trailer. Yet, during the sudden and forceful impact between the tractor and trailer, the skip plates will contact the trailer bolster plate and prevent it from digging into the plastic covering. Note, during such impact, the plastic covering will compress, without tearing, to the extent necessary to allow contact between the skip plates and trailer bolster plate. Also to be noted is that the portion of the skip plates extending rearwards of axis A prevents the trailer plate from gouging the plastic covering after the tractor bearing plate has tipped to a horizontal position.

Figure 3:
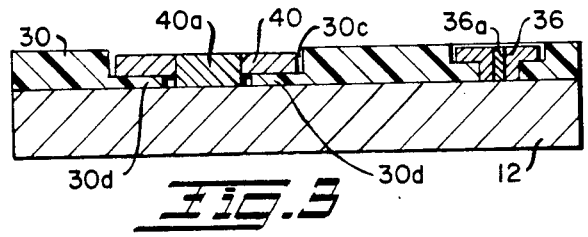
FIG. 3 is a cross section taken along the section taken along the section line 3—3 of FIG. 2.

As shown in the cross sectional view of FIG. 3, it is preferred that slots 30c formed in plastic covering 30 be counterbored to provide a flange 30d (e.g. 0.060 inch thick and 0.50 inch wide) which suports the skip plates. When affixed to the underlying bearing plate, the skip plates engage and capture flange 30d and thereby further serve as a means for attaching the plastic covering to bearing plate 12. The captured flange 30c acts to cushion the impact between the trailer bolster plate and the tractor's bearing plate during coupling. Preferably, the skip plates are affixed to bearing plate 12 by the above-mentioned plug welding technique through a series of spaced apertures 40a. By using such a welding technique, it is unnecessary to drill or otherwise modify the tractor bearing plate, as might be necessary, in order to condition such bearing plate to receive other types of fasteners (e.g. threaded studs).

By virtue of their elongated rectangular shape, their location in the interior region of the plastic covering, rearward of the pivot axis A, and their slightly recessed position relative to the upper surface of the plastic covering, skip plates 40 have been observed to produce virtually no adverse effects (e.g. uneven wear) on the trailer bolster plate after tens of thousands of miles of operation.

The invention has been described with particular refernece to a preferred embodiment. Various modifications can be made, of course, without departing from the spirit of the invention, and such modifications are intended to be within the scope of the following claims.

What is claimed is:

1. A fifth wheel assembly of the type used for coupling a tractor and trailer, said assembly comprising:
   (a) a metal bearing plate having a generally circular, flat portion having a pair of divergent, sloped flanges defining a slot for receiving and guiding a trailer kingpin;
   (b) a low-friction plastic covering overlying the circular portion and flanges of said bearing plate;
   (c) means for coupling said plastic covering to said bearing plate; and
   (d) a pair of spaced metal skip plates for protecting said plastic covering from damage during coupling between tractor and trailer, each of said skip plates having a generally rectangular shape and being rigidly coupled to said flange and circular portions of said bearing plate, said plastic covering having a pair of generally rectangular slots in the interior region thereof for receiving said skip plates.

2. The apparatus as defined by claim 1 wherein said slots are counterbored to define a flange portion about the slot periphery, said flange portion being captured by said skip plates when said skip plates are rigidly coupled to said bearing plate.

3. The apparatus as defined by claim 1 wherein said skip bars have a thickness slightly less than the thickness of said plastic covering so that said skip plates are recessed slightly below the upper surface of said plastic covering.

4. The apparatus as defined by claim 3 wherein said skip plates are recessed between about 0.010 and 0.030 inch below the upper surface of said plastic covering.

5. The apparatus as defined by claim 1 wherein said coupling means comprises a plurality of metal fasteners which are welded to said bearing surface through apertures formed in said plastic covering.

6. The apparatus as defined by claim 5 wherein said metal fasteners have a T-shaped cross section, and wherein said apertures are counterbored to receive said fasteners.

7. The apparatus as defined by claim 1 wherein said skip plates are angularly disposed with respect to each other.

8. The apparatus as defined by claim 1 wherein said bearing plate is pivotally mounted for movement about a horizontal axis extending perpendicular to the longitudinal axis of said slot, and wherein portions of the skip plates are located on both sides of said axis.

* * * * *